Dec. 8, 1936.  H. B. SIEMS  2,063,131

FERTILIZER DISTRIBUTOR

Filed Nov. 22, 1934

Herman B. Siems
INVENTOR

BY *Fay W. Johns*
ATTORNEY

Patented Dec. 8, 1936

2,063,131

UNITED STATES PATENT OFFICE 2,063,131

FERTILIZER DISTRIBUTOR

Herman B. Siems, Chicago, Ill., assignor to Swift & Company Fertilizer Works, Chicago, Ill., a corporation of Delaware Application November 22, 1934, Serial No. 754,304

5 Claims. (Cl. 299—84)

This invention relates to a fertilizer distributing device, and particularly to a device for distributing commercial fertilizer in a manner commonly known in the art as spraying.

One of the objects of the invention is to provide a device adapted for use with the ordinary garden hose, utilizing an air tight container in which granular solids such as a suitable fertilizer material may be placed and automatically discharged therefrom.

Another object of the invention is the novel arrangement of parts for the hydraulic distribution of a fertilizer containing elements of varying degrees of solubility in a uniform manner.

A further object of the invention is the provision of novel means for regulating the amount of water admixing with the fertilizer medium.

With the foregoing and other objects in view, the invention consists of the novel arrangement and combination of parts hereinafter more specifically claimed and illustrated in the accompanying drawing.

Figure 2 is a partial vertical sectional view of Figure 1, the supports being omitted.

Referring to the drawing:—

Figure 1:
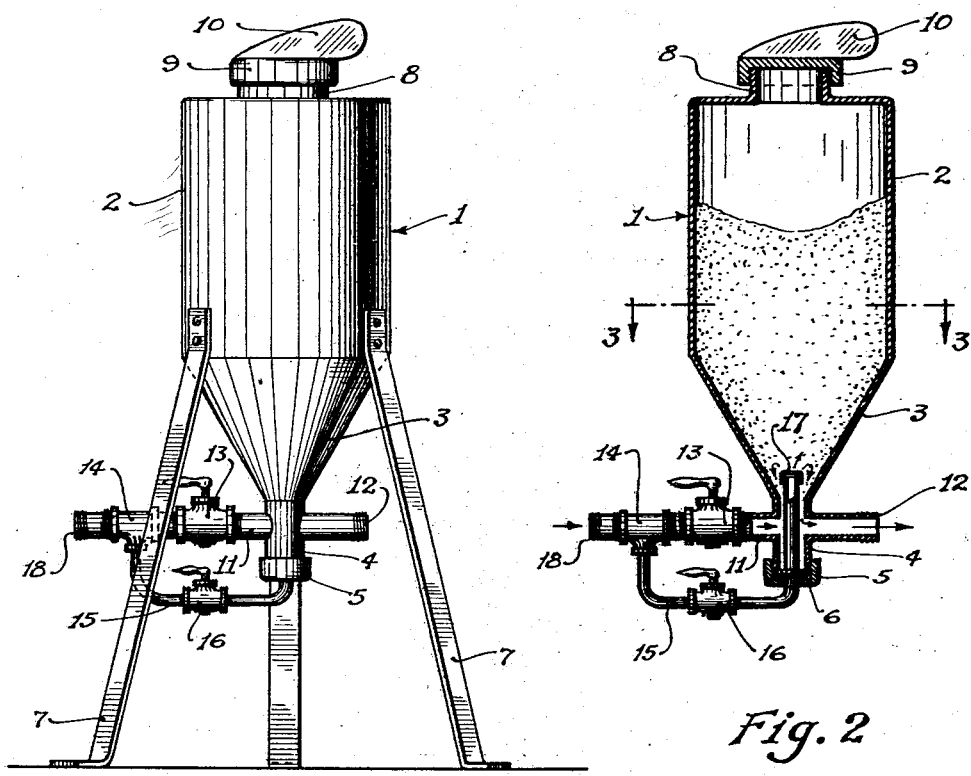
Figure 1 is an elevational view illustrating the one embodiment of the device constructed in accordance with the present invention.
Figure 4:
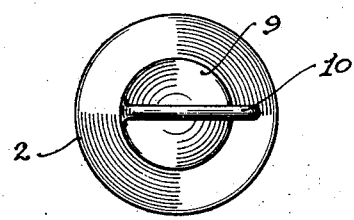
Figure 4 is a view of one form of a closure cap for the device shown in Figure 1.
Figure 3:
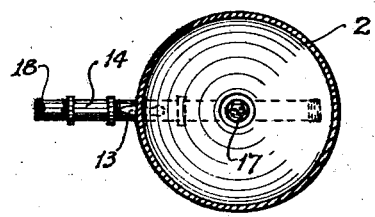
Figure 3 is a transverse sectional view taken on line 3—3 of Figure 2.

In Figure 1, the numeral 1 represents generally, one embodiment of the fertilizer distributor or spraying device and comprises a cylindrically shaped vessel 2, for containing a supply of fertilizer, the lower portion 3 of which is reduced to conical configuration. The conical shaped portion 3 is terminated into a reduced cylinder 4, the lower end of which is exteriorly threaded for the reception of a gland cap 5, provided with packing 6 in order to make the same leak proof. If desired, the cylindrical container may be mounted in any suitable manner upon legs 7, or any other suitable supporting means.

The top of the vessel 2 is provided with an opening through which a granular solid such as fertilizer may be introduced. Integral with the top at the opening, there is provided an annular flange 8 threaded for the reception of a closure cap 9 in a manner, such that the opening will be made air tight. The cap 9 is provided with a wing portion 10 for facilitating locking or unlocking the cap to or from the annular flange 8.

Intersecting the reduced portion 4 and communicating therewith, there is provided a primary conduit 11 of equal diameter, which may be integral with the reduced portion and through which water is supplied to the device. The outer end 12 of the conduit 11, is provided with screw threads for the reception of an ordinary garden spray hose, not shown in the drawing. The flow of water through primary conduit 11 is controlled by a main valve 13 positioned in the conduit 11 at a suitable distance before the reduced portion 4. This distance is optional but it being desirable to hold the overall dimension of the device to a minimum, the valve is placed as near to the reduced portion as is practicable.

In the conduit ahead of the main valve 13 is placed a T-joint 14, from which extends a U-shaped tubular by-pass or secondary conduit 15, which passes through an opening provided in the gland cap 5, and continues through the reduced cylindrical portion 4, to a free end, which extends slightly into the lower conical portion 3. It is to be noted that the by-pass or secondary conduit 15, is of less diameter than reduced cylindrical portion 4, and is held in spaced relation to the inner wall thereof by means of cap 5. The flow of water through the by-pass or secondary conduit 15 is controlled by a suitable hand valve 16, and is discharged into the lower conical portion 3 through a plurality of openings provided in a cap 17, which is connected to the free end of the by-pass or secondary conduit in any suitable manner.

The end 18 of the conduit 11 is threaded for the reception of an ordinary garden hose coupling, not shown in the drawing, leading from a supply of water.

In operation, a supply of soluble fertilizer in granular form is first introduced into the vessel 2 through the opening provided in the top thereof. The closure cap 9 is next positioned on threaded flange 8 in such manner as to make vessel 2 air tight. Conduit 11 is then connected to a supply of water at 18 and to an ordinary garden spray hose at 12. The device is ready to be placed in operation.

When the valve 13 is completely opened and the valve 16 completely closed, the supply of water entering conduit 11 in the direction of the arrows, will flow through the device practically void of fertilizer. By leaving the valve 13 completely opened and slightly opening the valve 16, a small portion of the water passing through conduit 11 will enter by-pass or secondary conduit 15 and issue through the openings provided in cap 17 and act upon a minimum quantity of the immediate fertilizer in vessel 2, and cause the same to pass through the space provided in reduced cylinder 4, to the main supply of water passing through conduit 11, to be thoroughly and proportionately mixed and concurrently sprayed therewith. Any soluble elements of the fertilizer will be dissolved by the water issuing from cap 17 and a proportionate amount of insoluble elements will be carried mechanically by the flow of water.

By partially closing the valve 13 and continuing to open the valve 16, a greater quantity of water will flow through by-pass 15 and through the openings in cap 17, and thereby act upon a greater quantity of fertilizer and cause the same to be carried into the main flow of water. When the valve 13 is completely closed and the valve 16 completely opened, the maximum quantity of fertilizer is moved per unit of time.

It will thus be seen that the amount of fertilizer may be regulated to any desired quantity by the adjustment of valves 13 and 16 and that by reason of the conical shaped portion 3 of the vessel 2, a fresh supply of fertilizer will continually feed in a uniform manner to the dispersing point at cap 17.

The device of the present application removes soluble material from the vessel in a satisfactory manner, carrying it along the stream of water through the hose, but the utility of the device is not limited to soluble fertilizer since it is equally efficient in removing insoluble material, for example, a granular plant food comprising approximately 50% of water soluble material and 50% of water insoluble material has been satisfactorily handled in practice, the particles being carried off mechanically by the action of the water, the water soluble materials, of course, going at least partly into solution.

It will be seen, therefore, that the device of the present application will operate for the distribution of such materials as sand as well as for the distribution of water soluble materials. The air tight cap prevents the water from rising to the top of the reservoir, the line pressure of the water being sufficient at least to slightly compress the air in the space above the material and coupled with capillary movement suffices to carry the water sufficiently high in the reservoir to mechanically carry down the particles of material.

It will be understood that the term granular solids is here used to include both soluble and insoluble solids and to include particles of a size ranging from powder up to larger sizes, it being necessary only that the particles be small enough in size to pass through the several openings provided therefor. Ordinarily the material used is about the size of beach sand or fine gravel with some powder present.

I claim:

1. A device for hydraulic distribution of granular solids comprising a cylindrical vessel having an opening through which granular solids may be introduced, a conical shaped lower portion terminating in a reduced cylinder, a closure cap for said opening, and supports for said vessel; a fluid conduit intersecting and communicating with said reduced cylinder; a tubular by-pass of reduced diameter in relation to said reduced cylinder having a fixed end and a free end, leading from the fixed end at a point in the fluid conduit to the free end, which passes through said reduced cylinder in spaced relation therewith, and extends slightly into the conical portion of said cylindrical vessel; a fluid control valve in said fluid conduit between said reduced cylinder and the fixed end of said by-pass; a fluid control valve in said by-pass and a cap having a plurality of openings secured over the free end of said by-pass.

2. A device for hydraulic distribution of granular solids comprising a conical shaped vessel terminating in a reduced cylinder, a fluid conduit intersecting and communicating with said reduced cylinder, a tubular by-pass of reduced diameter in relation to said reduced cylinder having a fixed end leading from a point in said fluid conduit and a free end which passes through said reduced cylinder in spaced relation therewith and extends slightly within said conical vessel, a fluid control valve in said fluid conduit between said reduced cylinder and the fixed end of said by-pass, a fluid control valve in said by-pass and a cap having a plurality of openings secured over the free end of said by-pass.

3. A device for hydraulic distribution of granular solids comprising a conical shaped vessel terminating in a reduced cylinder, a fluid conduit intersecting and communicating with said reduced cylinder, a tubular by-pass of reduced diameter in relation to said reduced cylinder having a fixed end leading from a point in said fluid conduit and a free end which passes through said reduced cylinder in spaced relation therewith and extends slightly within said conical vessel, a fluid control valve in said fluid conduit between said reduced cylinder and the fixed end of said by-pass and a fluid control valve in said by-pass.

4. A device for hydraulic distribution of granular solids comprising a conical shaped vessel terminating in a reduced cylinder, a fluid conduit intersecting and communicaing with said reduced cylinder, a tubular by-pass of reduced diameter in relation to said reduced cylinder having a fixed end leading from a point in said fluid conduit and a free end which passes through said reduced cylinder in spaced relation therewith and extends slightly within said conical vessel and valve means for regulating the flow of fluid from said fluid conduit through said by-pass.

5. A device for hydraulic distribution of granular solids comprising a conical shaped vessel terminating in a reduced cylinder, a fluid conduit intersecting and communicating with said reduced cylinder and a tubular by-pass of reduced diameter in relation to said reduced cylinder having a fixed end leading from a point in said fluid conduit and a free end which passes through said reduced cylinder in spaced relation therewith and extends slightly within said conical vessel.

HERMAN B. SIEMS.